US006827172B2

(12) United States Patent
Ide et al.

(10) Patent No.: US 6,827,172 B2
(45) Date of Patent: Dec. 7, 2004

(54) LATERAL INCLINATION ANGLE DETECTOR FOR PASSENGER-PROTECTING DEVICE FOR USE IN AUTOMOTIVE VEHICLE

(75) Inventors: Seiya Ide, Okazaki (JP); Mutsumasa Koujiya, Toyota (JP); Yoshihisa Ogata, Chiryu (JP)

(73) Assignee: Denso Corporation, Kariya (JP)

( * ) Notice: Subject to any disclaimer, the term of this patent is extended or adjusted under 35 U.S.C. 154(b) by 119 days.

(21) Appl. No.: 10/301,592

(22) Filed: Nov. 22, 2002

(65) Prior Publication Data

US 2003/0102178 A1 Jun. 5, 2003

(30) Foreign Application Priority Data

Dec. 4, 2001 (JP) ....................................... 2001-370401

(51) Int. Cl.[7] .......................... B60R 21/01; B60R 21/32

(52) U.S. Cl. ......................... 180/282; 280/735; 701/46; 340/440

(58) Field of Search ......................... 180/282; 280/735; 701/45, 46; 340/440, 689

(56) References Cited

U.S. PATENT DOCUMENTS 5,925,084 A 7/1999 Gotoh et al.
6,002,975 A * 12/1999 Schiffmann et al. ........ 180/282
6,535,800 B2 * 3/2003 Wallner ....................... 280/735
6,542,073 B2 * 4/2003 Yeh et al. ...................... 701/45
6,584,388 B2 * 6/2003 Schubert et al. ............ 280/735

FOREIGN PATENT DOCUMENTS

JP U-H05-37513 5/1993
JP A-H06-347264 12/1994
JP A-H08-43423 2/1996
JP 08040107 A * 2/1996 ........... B60K/25/00
JP A-H08-226816 9/1996
JP A-H09-21650 1/1997

* cited by examiner

*Primary Examiner*—Peter C. English
(74) *Attorney, Agent, or Firm*—Posz & Bethards, PLC

(57) ABSTRACT

A passenger-protecting device such as an air-bag system is activated upon detection of a vehicle lateral inclination angle exceeding a predetermined critical level. Such detection is performed by a lateral inclination detector having a pair of gravitational acceleration sensors for detecting a static road inclination and an angular velocity sensor for detecting a dynamic roll angle of the vehicle. Sensing directions of the pair of gravitational acceleration sensors are positioned to cross each other with a right angle and to make an angle of 45° with respect to a vehicle floor. The dynamic roll angle is calculated by integrating outputs of the angular velocity sensor. The vehicle inclination angle is obtained to summing up the static inclination angle and the roll angle. The passenger-protecting device is timely activated to protect passengers from overturn impact of the vehicle.

20 Claims, 6 Drawing Sheets

LATERAL INCLINATION ANGLE DETECTOR FOR PASSENGER-PROTECTING DEVICE FOR USE IN AUTOMOTIVE VEHICLE

CROSS-REFERENCE TO RELATED APPLICATION

This application is based upon and claims benefit of priority of Japanese Patent Application No. 2001-370401 filed on Dec. 4, 2001.

BACKGROUND OF THE INVENTION

1. Field of the Invention

The present invention relates to a detector for detecting a lateral inclination angle of an automotive vehicle. A passenger-protecting device such as an air-bag is put in operation when the detector detects a lateral inclination angle exceeding a predetermined level.

2. Description of Related Art

In a recent automotive vehicle, various passenger-protecting devices are used. For example, a side air-bag is inflated when a vehicle is hit from its lateral side, to protect passengers from a collision impact. When a vehicle is overturned by some reasons such as an excessively steep steering or bad conditions of a road, the passengers are protected by inflating the air-bag. To detect a lateral inclination angle which causes an overturn of a vehicle, a lateral inclination angle detector is used.

An example of such a lateral inclination angle detector is disclosed in JP-A-9-240399. In this detector, an angular velocity sensor is used to detect a roll angle of a vehicle. If the detected roll angle exceeds a predetermined level, the air-bag is inflated to protect passengers from impact caused by an overturn. The roll angle of a vehicle is detected by integrating an output of the angular velocity sensor with respect to time. Accordingly, a total inclination angle of a vehicle is not detected if a vehicle begins to roll on a road surface having its own inclination angle. Further, it is difficult to precisely detect a posture of the vehicle by the angular velocity sensor alone, because the vehicle shows complicated movement before the vehicle is overturned. Therefore, it has been difficult to operate the passenger-protecting device with high reliability at an optimum timing. It is necessary to precisely detect a lateral inclination of a vehicle including not only the roll angle but an initial road surface inclination before the vehicle is overturned.

SUMMARY OF THE INVENTION

The present invention has been made in view of the above-mentioned problem, and an object of the present invention is to provide an improved inclination angle detector which is able to precisely detect a total vehicle inclination including a roll angle and a road inclination angle before the vehicle is overturned to thereby protect passengers with high reliability.

A lateral inclination detector is composed of a pair of gravitational acceleration sensors, an angular velocity sensor and a control unit. The lateral inclination detector is mounted on an automotive vehicle. Sensitivity directions of the pair of gravitational acceleration sensors are positioned on a plane perpendicular to a driving direction of the vehicle, so that both sensitivity directions cross each other with a right angle (90°) and make an angle of 45° with respect of a floor surface of the vehicle. In this manner, symmetric outputs can be obtained from both gravitational acceleration sensors for both inclination directions. The angular velocity sensor is mounted on the vehicle to generate outputs proportional to an angular velocity due to a rolling motion of the vehicle.

The control unit calculates a static lateral inclination angle based on the outputs of the pair of gravitational acceleration sensors and a dynamic roll angle based on the outputs of the angular velocity sensor. The roll angle is obtained by integrating the outputs of the angular velocity sensor with respect to time. The calculated static lateral inclination angle and the roll angle are summed up to obtain a total vehicle inclination angle. The total vehicle inclination angle is compared with a predetermined critical angle at which the vehicle is expected to overturn. If the former is larger than the later, it is determined that the vehicle is about to overturn. Upon such a determination, a passenger-protecting device such as an air-bag system is put in operation to protect passengers from impact of an overturn of the vehicle.

Under certain situations, e.g., when the vehicle is driving through a road depression or overriding an obstacle on a road, excessively high outputs are temporarily generated in the sensors. To avoid a false determination that the vehicle is about to overturn, the calculation of the static lateral inclination angle and the roll angle based on such temporarily generated high outputs is canceled.

According to the present invention, the total vehicle inclination angle is precisely detected under various situations including a situation where the vehicle starts to roll on an inclined road surface before the vehicle is actually overturned. Therefore, the passengers are protected from the overturn impact with high reliability by putting the passenger-protecting device in operation in a timely manner.

In one or more embodiments of the lateral inclination detector, the control unit includes means for canceling calculation of the static lateral inclination angle when a compound vector of the outputs from the first and the second gravitational acceleration sensors exceeds a predetermined level.

In one or more embodiments of the lateral inclination detector, the control unit includes means for monitoring a difference between the static inclination angle and the dynamic roll angle and for evaluating reliability of both angles based on the difference thereof.

DETAILED DESCRIPTION OF THE PREFERRED EMBODIMENT

Figure 1:
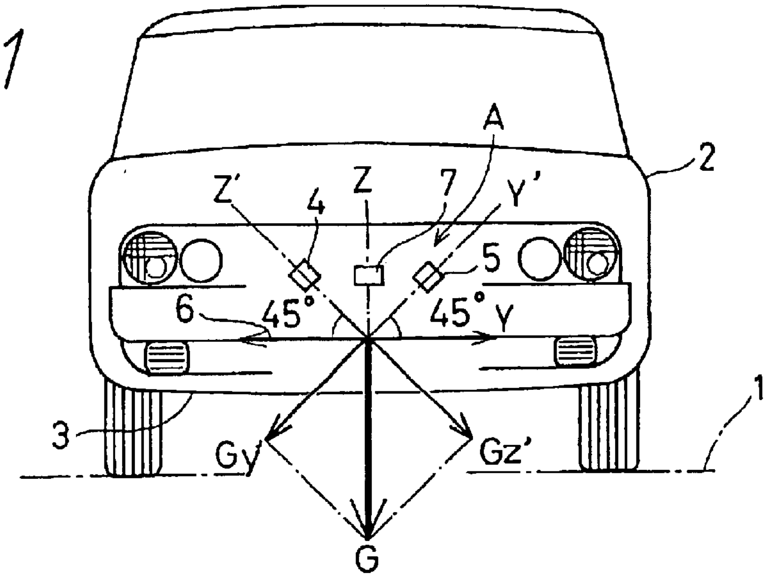
FIG. 1 is a schematic view showing an automotive vehicle on which first and second gravitational acceleration sensors and an angular velocity sensor are mounted.

A preferred embodiment of the present invention will be described with reference to accompanying drawings. First, referring to FIG. 1, mounting positions of gravitational acceleration sensors 4, 5 and an angular velocity sensor 7 will be described. A lateral inclination detector "A" composed of a first gravity acceleration sensor 4, a second gravity acceleration sensor 5 and an angular velocity sensor 7 are mounted on a vehicle 2 driving on a road surface 1. A floor surface 6 is formed on a floor frame 3.

Both acceleration sensors 4, 5 are mounted on the vehicle so that their sensitivity directions are positioned on a vertical plane perpendicular to a driving direction of the vehicle. On the vertical plane, a Y-axis is set along the floor surface 6, and a Z-axis is set in a direction perpendicular to the Y-axis. The sensitivity direction of the first acceleration sensor 4 is set on a Z'-axis which is rotated by 45° counter-clockwise from the Z-axis. The sensitivity direction of the second acceleration sensor 5 is set on a Y'-axis which is rotated by 45° counter-clockwise from the Y-axis. In other words, the sensitivity directions of both acceleration sensors 4, 5 are symmetrically positioned with respect to the Z-axis, crossing each other with a right angle (90°).

Figure 2:
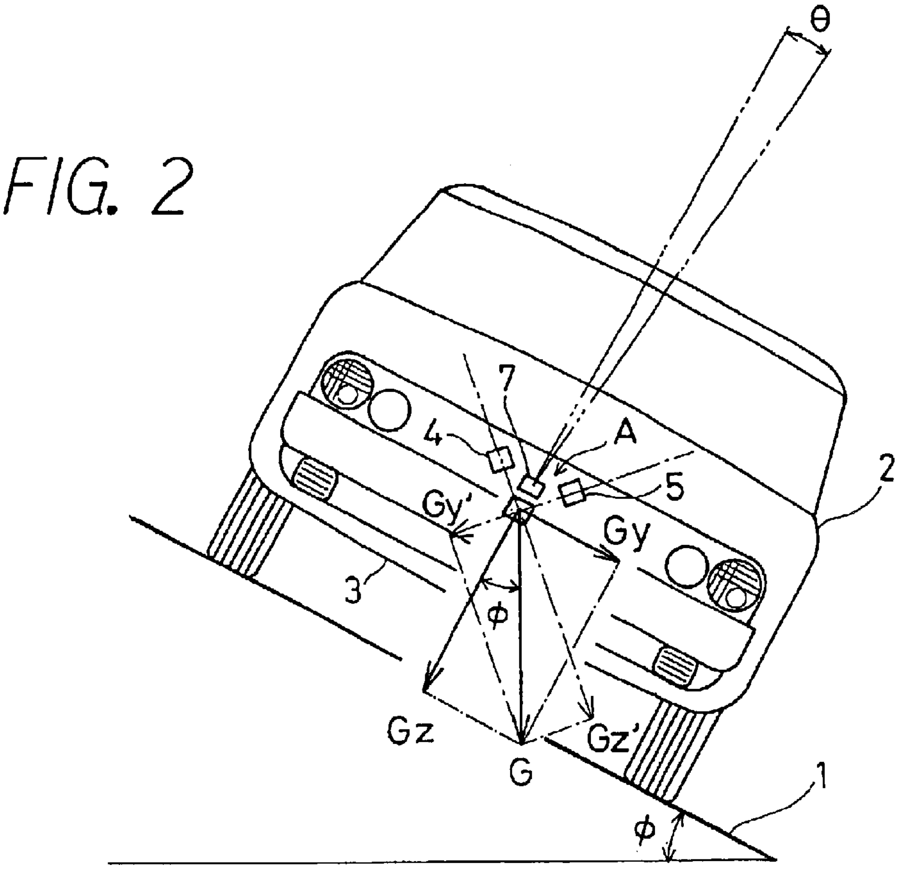
FIG. 2 is a schematic view showing a way of detecting a static lateral inclination angle of a vehicle by the first and the second gravitational acceleration sensors.

As shown in FIG. 1, a compound vector formed by a vector Gz' sensed by the first acceleration sensor 4 and a vector Gy' sensed by the second acceleration sensor 5 corresponds to a gravity vector G ($Gy'+Gz'=G=Gy+Gz$). Similarly, when the vehicle is statically inclined on a road surface 1 having a inclination angle Φ, as shown in FIG. 2, a compound vector formed by Gy' and Gz' corresponds to the gravity vector G. The inclination angel Φ is expressed by: $\Phi=\tan^{-1}(Gy/Gz)$. Accordingly, the static inclination angle Φ is detected by Gz' sensed by the first sensor 4 and Gy' sensed by the second sensor 5 according to the following formula: $(45°-\Phi)=\tan^{-1}(Gy'/Gz')$. That is, the static inclination angle Φ is calculated according to the formula: $\Phi=45°-\tan^{-1}(Gy'/Gz')$.

The gravitational acceleration Gz in a direction perpendicular to the floor surface 6 is calculated based on the detected inclination angle Φ according to the following formula: $Gz=G\cdot\cos\Phi$. For example, if the inclination angle Φ is 30 degrees, Gz is about 0.87 G. Though the detection of the static inclination angle is described with reference to FIG. 2 showing the vehicle inclining in one direction, the inclination angle is similarly detected when the vehicle inclines in an opposite direction.

When the vehicle laterally rolls due to road conditions or driving conditions, a dynamic roll angle θ is calculated by integrating outputs (dθ/dt) from the angular velocity sensor 7 with respect to time: $\theta=\int(d\theta/dt)dt$. A total inclination angle Σ in a lateral direction is a sum of the static inclination angel Φ and the dynamic roll angle θ. That is, $\Sigma=\Phi+\theta$.

Figure 3:
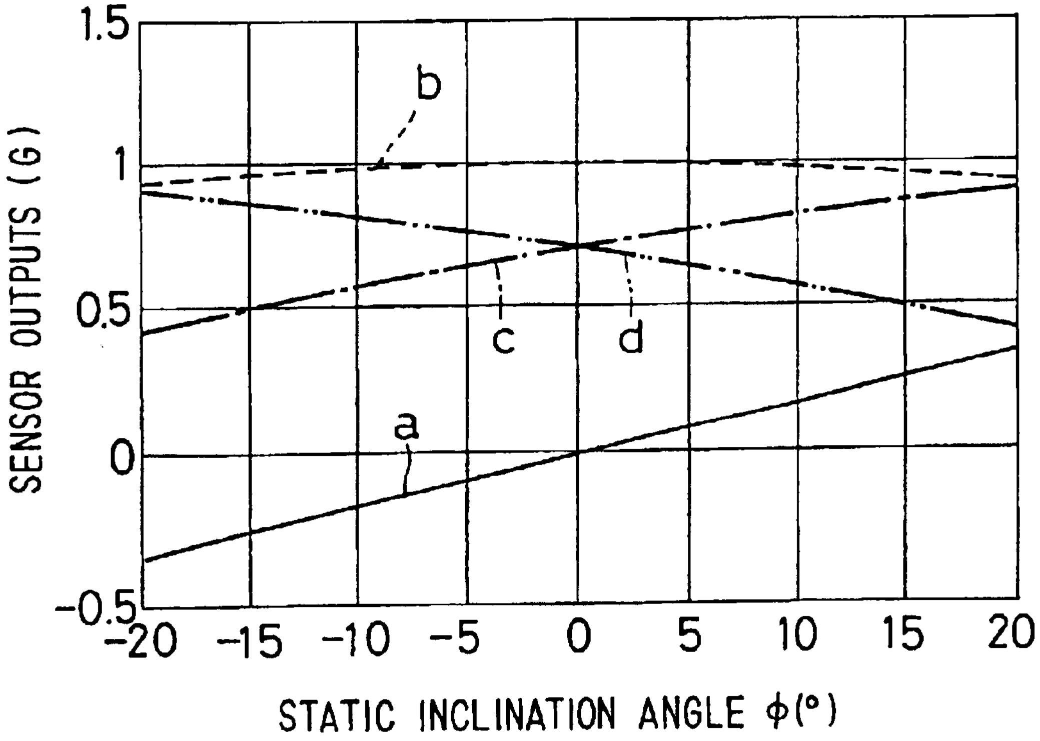
FIG. 3 is a graph showing a relation between outputs of the gravitational acceleration sensors and a static lateral inclination angle of a vehicle.

The first and second gravity acceleration sensors 4, 5 are positioned so that their sensitivity directions are directed in the Z'-axis and the Y'-axis, respectively, each of which makes an angle of 45° with respect to the floor surface 6, as shown in FIG. 2. If the sensitivity directions of those sensors 4, 5 are positioned in the directions Y (parallel to the floor surface 6) and in the direction Z (perpendicular to the floor surface 6), respectively, the outputs of those sensors are not symmetric with respect to the vehicle inclination direction. The outputs of such sensors are shown in FIG. 3 together with those of the sensors positioned according to the present invention. The output of the sensor positioned along the Y-axis is shown by line "a", and the output of the sensor positioned along the Z-axis is shown by line "b." The outputs of the sensors 4, 5 positioned according to the present invention are shown by lines "c" and "d." As seen in the graph, the outputs of both sensors 4, 5 positioned according to the present invention are symmetric with respect to a vertical line showing a zero inclination angle. Therefore, the static inclination angle Φ is accurately detected, irrespective of inclination directions, by positioning both sensors 4, 5 with an angle of 45° with respect to the floor surface 6.

Figure 4:
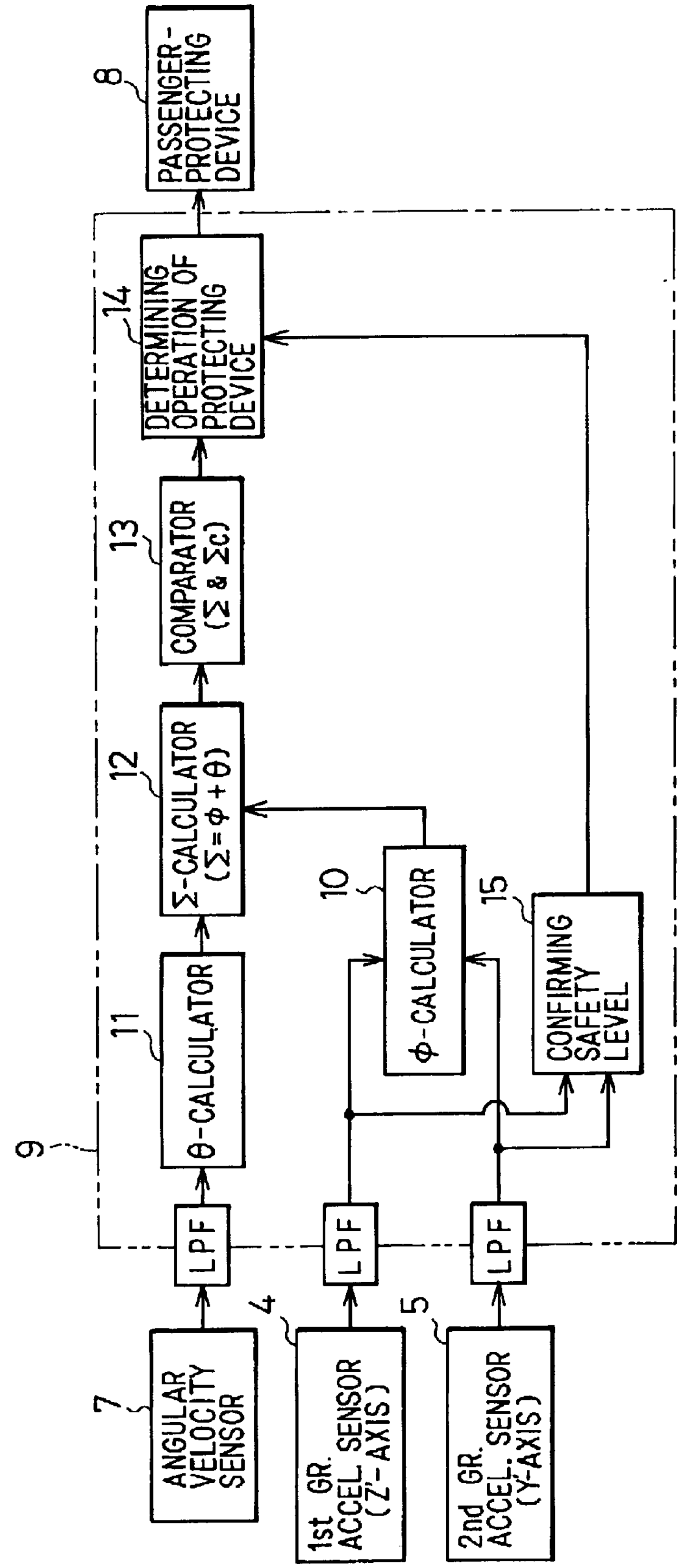
FIG. 4 is a block diagram showing a control unit for controlling operation of a passenger-protecting device based on outputs of gravitational acceleration sensors and an angular velocity sensor.

Referring to FIG. 4, a control unit 9 that calculates the static inclination angle Φ and the dynamic roll angle θ based on the outputs from the gravity accelerations sensors 4, 5 and the angular velocity sensor 7 will be described. The control unit 9 determines to operate the passenger-protecting device 8 when the total inclination angle Σ, which is a sum of the static inclination angle Φ and the dynamic roll angle θ, exceeds a predetermined critical level.

Upon turning on an ignition switch of the vehicle, both gravity acceleration sensors 4, 5 and the angular velocity sensor 7 are activated. The outputs of both acceleration sensors 4, 5 are fed to a block 10 which calculates the static inclination angle Φ based on the outputs fed from the sensors 4, 5. The outputs of the angular velocity sensor 7 are fed to a block 11 which calculates the dynamic roll angle θ based on the outputs from the angular velocity sensor 7. The dynamic roll angle θ is calculated by integrating the outputs of the angular velocity sensor 7 with respect to time ($\theta=\int(d\theta/dt)dt$).

The static inclination angle Φ and the dynamic roll angle θ are fed to a block 12 which calculates the total inclination angle Σ by summing up the static inclination angle Φ and the dynamic roll angle θ ($\Sigma=\Phi+\theta$). The calculated total inclination angle Σ is fed to a comparator block 13 which compares the angle Σ with a predetermined critical angle Σc stored in a memory (not shown). The predetermined critical angle Σc is an inclination angle at which the vehicle is expected to overturn. If Σ is equal to or larger than the critical level Σc, the comparator block 13 feeds an ON signal to a determining block 14.

On the other hand, the outputs from the gravity acceleration sensors 4, 5 are fed to a safety level confirming block 15 which confirms the outputs representing the static inclination angle. After the confirmation is made, a confirmation signal is fed to a determining block 14 which determines to put the passenger-protecting device in operation. When both of the ON signal from the comparator block 13 and the confirmation signal from the confirming block 15 are received by the determining block 14, the determining block 14 generates a signal to operate the passenger-protecting device 8. The outputs from the angular velocity sensor 7 or the calculated roll angle, or signals from all the sensors 4, 5 and 7 may be fed to the confirming block 15 in place of the outputs from the acceleration sensors 4, 5. Those signals or the outputs may be confirmed by the confirming block 15.

Figure 5:
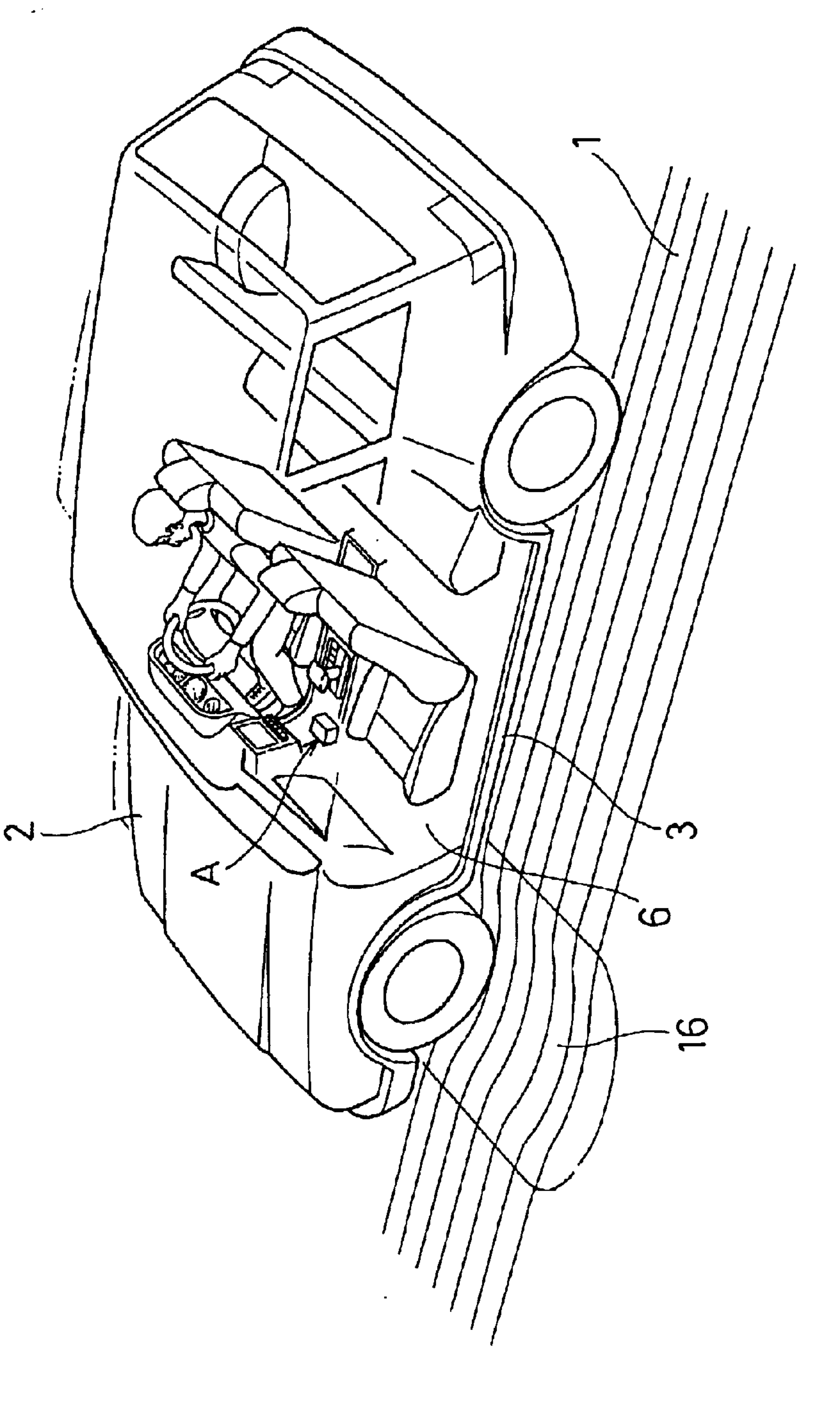
FIG. 5 is a perspective view showing a vehicle driving through a depression on a road surface.

In case where the vehicle drives over obstacles on a road, or a vehicle wheel is caught by a hole, the vehicle suddenly inclines and excessively high outputs are temporarily generated by the gravity acceleration sensors 4, 5. This may also happen when the vehicle makes a lateral skid, or when the vehicle drives through a depression 16 formed on the road, as shown in FIG. 5. Under these situations, a high acceleration which exceeds the gravity acceleration G is imposed on the vehicle, and the compound vector formed by outputs of both gravity acceleration sensors 4, 5 does not coincides with the gravity acceleration G ($Gy+Gz\neq G$; $Gy'+Gz'\neq G$). To cope with this problem, the detection of the static inclination angle Φ is temporarily stopped or canceled under these situations.

Low-pass filters (LPF) shown in FIG. 4, each connected to respective sensors 4 and 5 may cut such temporary sensor outputs having an excessively high level. Alternatively, additional devices may be added to the control unit 9 for canceling the detection of the static inclination angle. In this manner, it is prevented to make a false judgment that the vehicle is about to overturn based on the temporary sensor outputs having an excessively high level.

Figure 6:
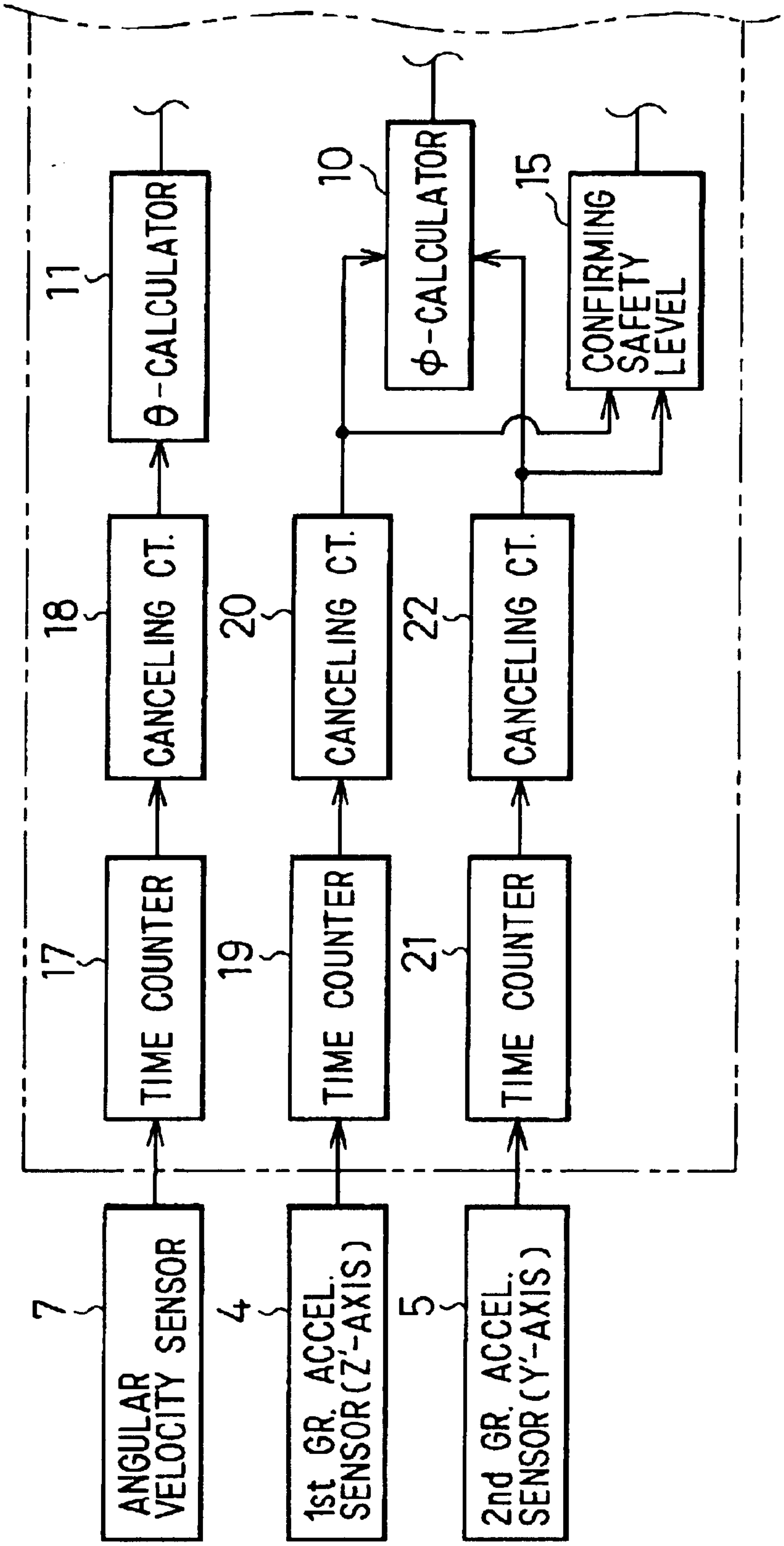
FIG. 6 is a block diagram showing a modified form of the control unit shown in FIG. 4.

FIG. 6 shows a modified form of the control unit 9 that includes the function for canceling the detection of the static inclination angle Φ and the roll angle θ. In FIG. 6, a time counter 17 and a canceling circuit 18 are connected between the angular velocity sensor 7 and the block 11 for calculating the dynamic roll angle. Similarly, a time counter 19 and a canceling circuit 20 are connected between the first gravity acceleration sensor 4 and the block 10 for calculating the static inclination angle, and a time counter 21 and a canceling circuit 22 are connected between the second gravity acceleration sensor 5 and the block 10.

When outputs having an excessively high level are temporarily fed from the angular velocity sensor 7, a period of time in which the high level outputs are fed is measured by the time counter 17. If the measured period of time is shorter than a predetermined period of time, the high outputs are interrupted by the canceling circuit 18, and the block 11 does not perform the calculation of the dynamic roll angle. Similarly, when the first and the second gravity acceleration sensors 4, 5 output excessively high outputs, a period of time in which such high outputs continue is measured by the time counters 19, 21. If the measured period of time is shorter than a predetermined period of time, such high level outputs are interrupted by the canceling circuits 20, 22, and the block 10 does not calculate the static inclination angle.

In this manner, the temporary high level outputs from the sensors 4, 5 and 7 are interrupted, and thereby a false judgment determining that the vehicle is about to overturn based on the temporary outputs having an excessively high level is avoided. That is, it is avoided to judge that the vehicle is about to overturn when the vehicle quickly recovers its normal posture after it has made a sharp lateral inclination for a short period of time due to abnormal road conditions or driving conditions. Accordingly, unnecessary operation of the passenger-protecting device 8 is avoided. Though a combination of the time counter and the canceling circuit is used to avoid such a false judgment in the control unit 9 shown in FIG. 6, it is also possible to use a combination of a time counter and a low-pass filter (LPF).

According to the present invention, the vehicle inclination angle Σ is detected by combining the static inclination angle Φ and the dynamic roll angle θ before the vehicle is overturned. Therefore, the passenger-protecting device 8 is surely operated at an optimum timing, and thereby the passengers are protected form the impacts caused by an overturn of the vehicle with high reliability. When the vehicle begins to roll on a road surface having an inclination angle Φ, the vehicle inclination angle Σ is calculated by adding the roll angle θ to the road inclination angle Φ, as opposed to a conventional detector in which the vehicle inclination is determined solely depending on the roll angle.

Further, a false judgment resulting from temporary high outputs from the sensors 4, 5, and 7 due to driving through a road depression or overriding an obstacle on a road is avoided by canceling calculation of the vehicle inclination angle under such situations. Accordingly, the passenger-protecting device 8 is not unnecessarily operated.

The present invention is not limited to the embodiment described above, but it may be variously modified. For example, the sensitivity directions of the first and the second sensors 4, 5 may be positioned, relative to the floor surface 6, at other angles than 45°. The sensitivity directions may be positioned at angles, e.g., 30°, 35° or 40°. The angular velocity sensor 7 may be constituted by a tuning fork or an optical fiber gyroscope. The first and the second gravity acceleration sensors 4, 5 and the angular velocity sensor 7 may be installed in the control unit 9. Further, such sensors may be activated not only when the vehicle engine is in operation but also when the vehicle engine is not operating. The operation of the control unit 9 may be halted by a timer until the outputs of the sensors 4, 5 and 7 are stabilized after the engine is started.

Figure 7:
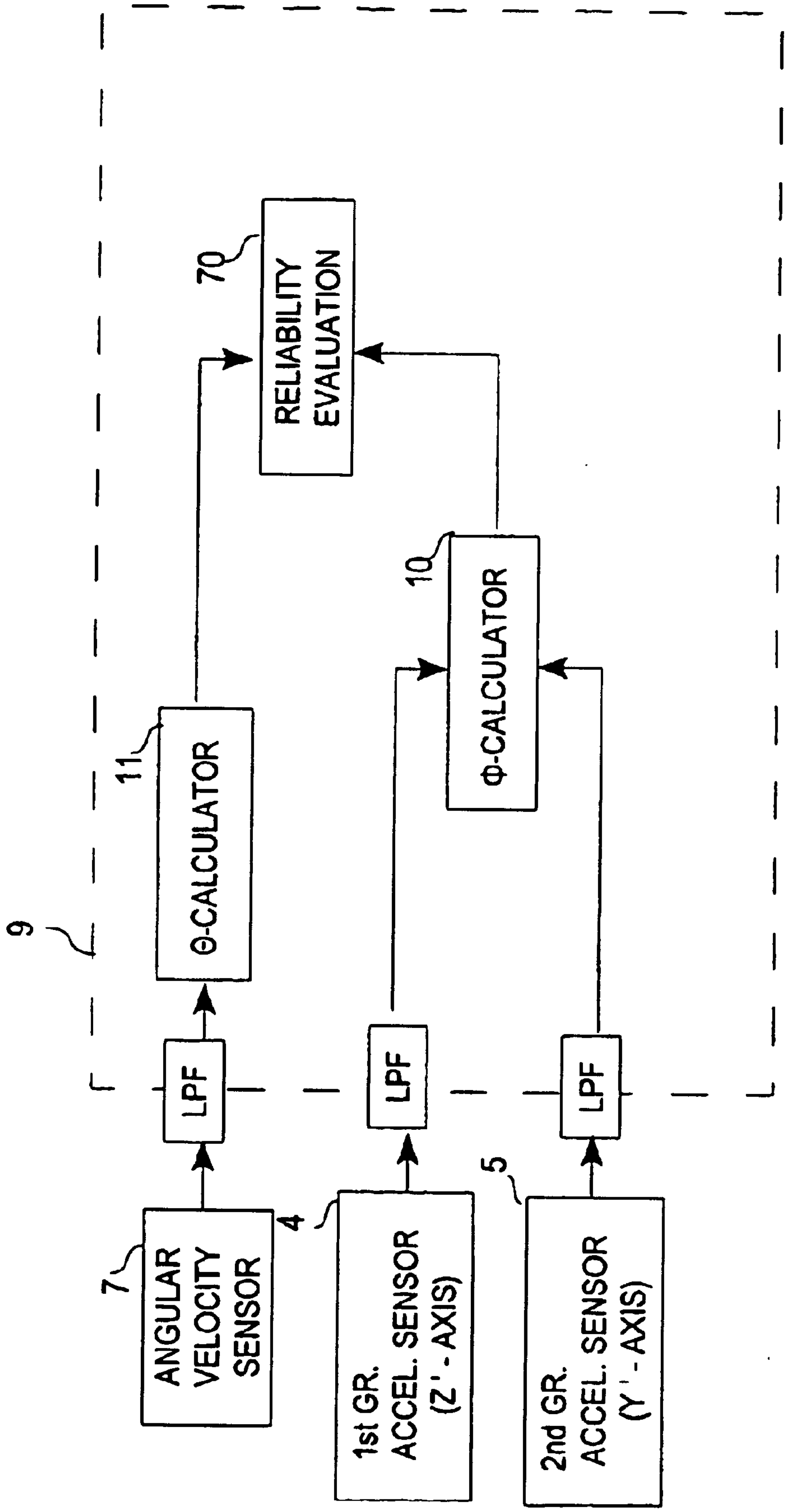
FIG. 7 is a block diagram is a block diagram illustrating a monitoring of detected values of the inclination angle and the roll angle.

Further, reliability of the outputs of the sensors 4, 5 and 7 may be evaluated by monitoring the detected values of the inclination angle Φ and the roll angle Θ. For example, as illustrated in FIG. 7, a difference of the inclination angle Φ block 11 and the roll angle Θ block 10 maybe monitored block 70 and the reliability evaluation may be made based on not only the detected angles Φ and Θ but also static and dynamic vehicle conditions such as vehicle speed and a steering angle.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A lateral inclination detector mounted on an automotive vehicle for controlling operation of a passenger-protecting device, the lateral inclination detector comprising:

a first gravitational acceleration sensor and a second gravitational acceleration sensor for detecting a static lateral inclination angle of the automotive vehicle;

an angular velocity sensor for detecting a dynamic roll angle of the automotive vehicle; and a control unit for calculating the static lateral inclination angle based on outputs of the first and the second gravitational acceleration sensors and for calculating the dynamic roll angle by integrating outputs of the angular velocity sensor with respect to time, wherein:

the control unit puts the passenger-protecting device in operation when a sum of the static lateral inclination angle and the dynamic roll angle exceeds a predetermined critical level.

2. The lateral inclination detector as in claim 1, wherein:

sensitivity directions of the first and the second gravitational acceleration sensors are positioned to cross each other with a right angle on a plane perpendicular to a driving direction of the automotive vehicle.

3. The lateral inclination detector as in claim 2, wherein:

the sensitivity directions of the first and the second gravitational acceleration sensors are positioned to make an angle of 45° with respect to a floor surface of the automotive vehicle.

4. The lateral inclination detector as in claim 1, wherein:

the control unit includes means for monitoring a difference between the static inclination angle and the dynamic roll angle and for evaluating reliability of both angles.

5. The lateral inclination detector as in claim 1, wherein:

the lateral inclination detector further includes low pass filters for preventing temporarily high outputs of the first and the second gravitational acceleration sensors from being fed to the control unit.

6. The lateral inclination detector as in claim 1, wherein:

the control unit includes means for canceling calculation of the static lateral inclination angle and the dynamic roll angle when outputs of the gravitational acceleration sensors and the angular velocity sensor are excessively high for a period of time shorter than a predetermined period of time.

7. The lateral inclination detector as in claim 1, wherein:

sensitivity directions of the first and second gravitational acceleration sensors are positioned approximately symmetrically with respect to a floor surface of the automotive vehicle.

8. A method for detecting lateral inclination, used in connection with on an automotive vehicle for controlling operation of a passenger-protecting device, the method comprising:

detecting, in a first gravitational acceleration sensor and a second gravitational acceleration sensor, a static lateral inclination angle of the automotive vehicle;

detecting, in an angular velocity sensor, a dynamic roll angle of the automotive vehicle; and calculating, in a control unit, the static lateral inclination angle based on outputs of the first and the second gravitational acceleration sensors, and calculating the dynamic roll angle by integrating outputs of the angular velocity sensor with respect to time, wherein:

the control unit puts the passenger-protecting device in operation when a sum of the static lateral inclination angle and the dynamic roll angle exceeds a predetermined critical level.

9. The method as in claim 8, wherein:

sensitivity directions of the first and the second gravitational acceleration sensors are positioned to cross each other with a right angle on a plane perpendicular to a driving direction of the automotive vehicle.

10. The method as in claim 9, wherein:

the sensitivity directions of the first and the second gravitational acceleration sensors are positioned to make an angle of 45° with respect to a floor surface of the automotive vehicle.

11. The method as in claim 8, further comprising:

monitoring, in the control unit, a difference between the static inclination angle and the dynamic roll angle and for evaluating reliability of both angles.

12. The method as in claim 8, wherein:

preventing, with low pass filters, temporarily high outputs of the first and the second gravitational acceleration sensors from being fed to the control unit.

13. The method as in claim 8, further comprising:

canceling, in the control unit, calculation of the static lateral inclination angle and the dynamic roll angle when outputs of the gravitational acceleration sensors and the angular velocity sensor are excessively high for a period of time shorter than a predetermined period of time.

14. The method as in claim 8, wherein:

sensitivity directions of the first and second gravitational acceleration sensors are positioned approximately symmetrically with respect to a floor surface of the automotive vehicle.

15. A lateral inclination detector mounted on an automotive vehicle for controlling operation of a passenger-protecting device, the lateral inclination detector comprising:

a first gravitational acceleration sensor and a second gravitational acceleration sensor for detecting a static lateral inclination angle of the automotive vehicle;

an angular velocity sensor for detecting a dynamic roll angle of the automotive vehicle; and a control unit means for calculating the static lateral inclination angle based on outputs of the first and the second gravitational acceleration sensors and for calculating the dynamic roll angle by integrating outputs of the angular velocity sensor with respect to time, wherein:

the control unit means puts the passenger-protecting device in operation when a sum of the static lateral inclination angle and the dynamic roll angle exceeds a predetermined critical level.

16. The lateral inclination detector as in claim 15, wherein:

sensitivity directions of the first and the second gravitational acceleration sensors are positioned to cross each other with a right angle on a plane perpendicular to a driving direction of the automotive vehicle.

17. The lateral inclination detector as in claim 16, wherein:

the sensitivity directions of the first and the second gravitational acceleration sensors are positioned to make an angle of 45° with respect to a floor surface of the automotive vehicle.

18. The lateral inclination detector as in claim 15, wherein:

the control unit means includes means for monitoring a difference between the static inclination angle and the dynamic roll angle and for evaluating reliability of both angles.

19. The lateral inclination detector as in claim 15, wherein:

the lateral inclination detector further includes low pass filters for preventing temporarily high outputs of the first and the second gravitational acceleration sensors from being fed to the control unit.

20. The lateral inclination detector as in claim 15, wherein:

the control unit means includes means for canceling calculation of the static lateral inclination angle and the dynamic roll angle when outputs of the gravitational acceleration sensors and the angular velocity sensor are excessively high for a period of time shorter than a predetermined period of time.

* * * * *